(12) United States Patent
Kobayashi et al.

(10) Patent No.: US 11,947,184 B2
(45) Date of Patent: Apr. 2, 2024

(54) LENS BARREL AND IMAGING DEVICE

(71) Applicants: Takahiro Kobayashi, Tokyo (JP);
Tomoaki Kobayashi, Tokyo (JP);
Takahiro Nakayama, Kanagawa (JP)

(72) Inventors: Takahiro Kobayashi, Tokyo (JP);
Tomoaki Kobayashi, Tokyo (JP);
Takahiro Nakayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 435 days.

(21) Appl. No.: 17/429,370

(22) PCT Filed: Mar. 12, 2020

(86) PCT No.: PCT/JP2020/010959
§ 371 (c)(1),
(2) Date: Aug. 9, 2021

(87) PCT Pub. No.: WO2020/189532
PCT Pub. Date: Sep. 24, 2020

(65) Prior Publication Data
US 2022/0146784 A1 May 12, 2022

(30) Foreign Application Priority Data
Mar. 15, 2019 (JP) .................................. 2019-048910

(51) Int. Cl.
*G02B 7/10* (2021.01)
*G02B 15/14* (2006.01)

(52) U.S. Cl.
CPC .............. *G02B 7/10* (2013.01); *G02B 15/14* (2013.01)

(58) Field of Classification Search
CPC .................................. G02B 7/10; G02B 15/14
See application file for complete search history.

(56) References Cited

U.S. PATENT DOCUMENTS 7,710,661 B2  5/2010  Iwasaki
8,520,129 B2  8/2013  Hongu
(Continued)

FOREIGN PATENT DOCUMENTS

CN   1177749 A    4/1998
CN   101464555 A  6/2009
(Continued)

OTHER PUBLICATIONS

Chinese Office Action dated Oct. 27, 2022, in corresponding Chinese Patent Application No. 202080017628.6, 17pp with English-language translation.

(Continued)

*Primary Examiner* — James C. Jones
(74) *Attorney, Agent, or Firm* — XSENSUS LLP

(57) ABSTRACT

A lens barrel includes: a variable-power optical system including a focus lens group; a focus actuator configured to move the focus lens group supported by a support forward or backward in a direction of the optical axis to change a shooting distance; and a moving unit configured to, in response to receiving a driving force for changing a zoom magnification, move a position of the focus lens group in the direction of the optical axis to a position corresponding to the changed zoom magnification. The moving unit is configured to move the focus lens group in the direction of the optical axis by the driving force such that a change in a shooting distance due to a change in the zoom magnification is within a predetermined tolerance when the focus lens group is at a position corresponding to the minimum shooting distance, at every zoom magnification.

7 Claims, 7 Drawing Sheets

(56) References Cited

U.S. PATENT DOCUMENTS

| | | | |
|---|---|---|---|
| 8,855,477 B2 | 10/2014 | Kudoh | |
| 9,995,916 B2 | 6/2018 | Segawa et al. | |
| 2007/0153403 A1 | 7/2007 | Yamazaki | |
| 2009/0161232 A1 | 6/2009 | Iwasaki | |
| 2010/0046085 A1 | 2/2010 | Yumiki et al. | |
| 2010/0171870 A1 | 7/2010 | Hongu | |
| 2011/0149142 A1 | 6/2011 | Yumiki et al. | |
| 2012/0176531 A1* | 7/2012 | Yumiki | H04N 23/675 348/E5.045 |
| 2013/0050534 A1 | 2/2013 | Kudoh | |
| 2014/0118840 A1 | 5/2014 | Enomoto | |
| 2014/0168793 A1 | 6/2014 | Fukino | |
| 2017/0336600 A1 | 11/2017 | Segawa et al. | |
| 2019/0179109 A1 | 6/2019 | Sakai et al. | |
| 2020/0409031 A1 | 12/2020 | Sakai et al. | |

FOREIGN PATENT DOCUMENTS

| | | |
|---|---|---|
| CN | 101470247 A | 7/2009 |
| CN | 101515059 A | 8/2009 |
| CN | 101776835 A | 7/2010 |
| CN | 102967916 A | 3/2013 |
| CN | 104205800 A | 12/2014 |
| CN | 107402437 A | 11/2017 |
| JP | 2007-188061 A | 7/2007 |
| JP | 2008-064799 | 3/2008 |
| JP | 2010-049202 A | 3/2010 |
| JP | 2013-122558 A | 6/2013 |
| JP | 2013-247435 A | 12/2013 |
| JP | 2014-016514 A | 1/2014 |
| WO | 2018/221723 | 12/2018 |

OTHER PUBLICATIONS

Office Action dated Aug. 23, 2022 in Japanese Patent Application No. 2019-048910, 2 pages.
Office Action dated Aug. 25, 2023 in Chinese Patent Application No. 202080017628.6, 8 pages.
International Search Report dated Jun. 19, 2020 in PCT/JP2020/010959 filed Mar. 12, 2020, 8 pages.

* cited by examiner

[Fig. 1]
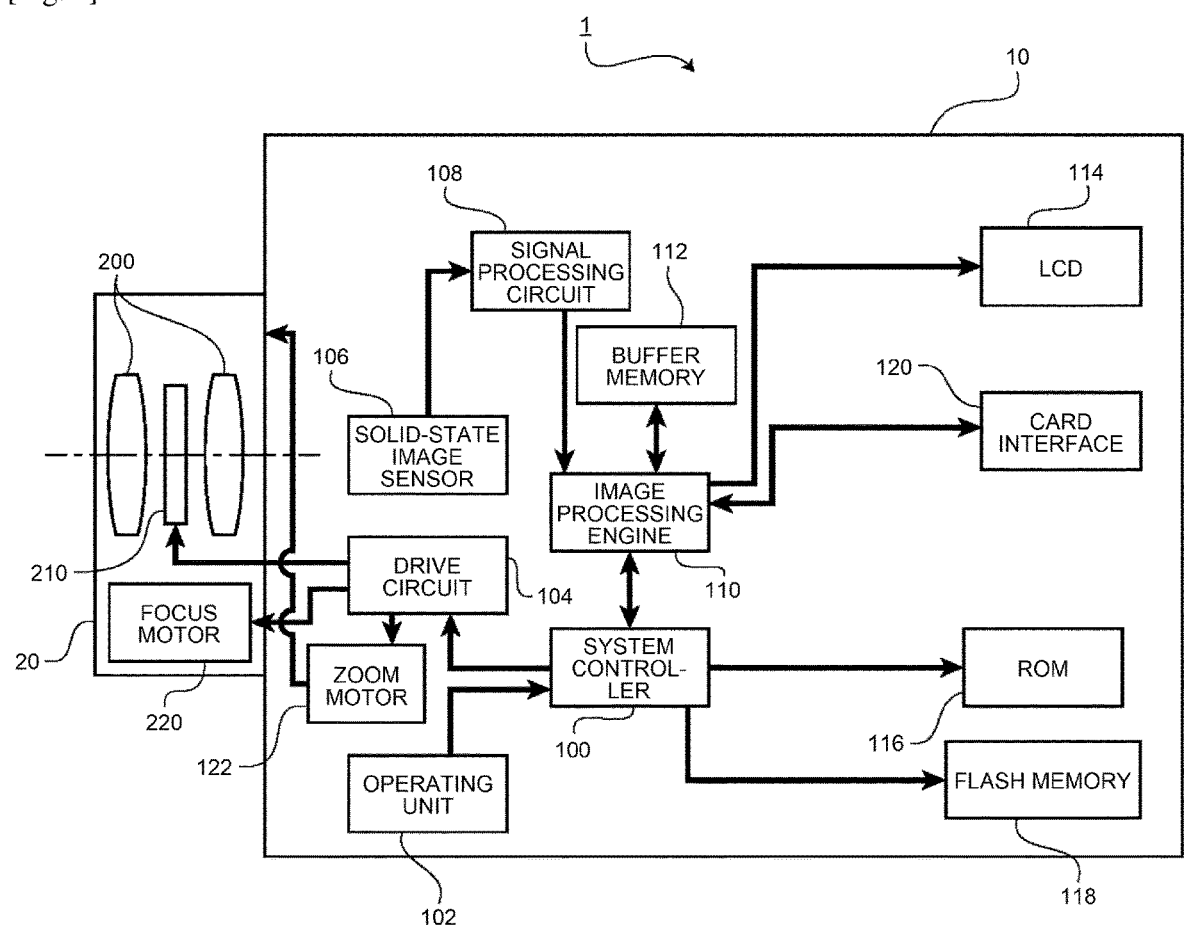

[Fig. 2]
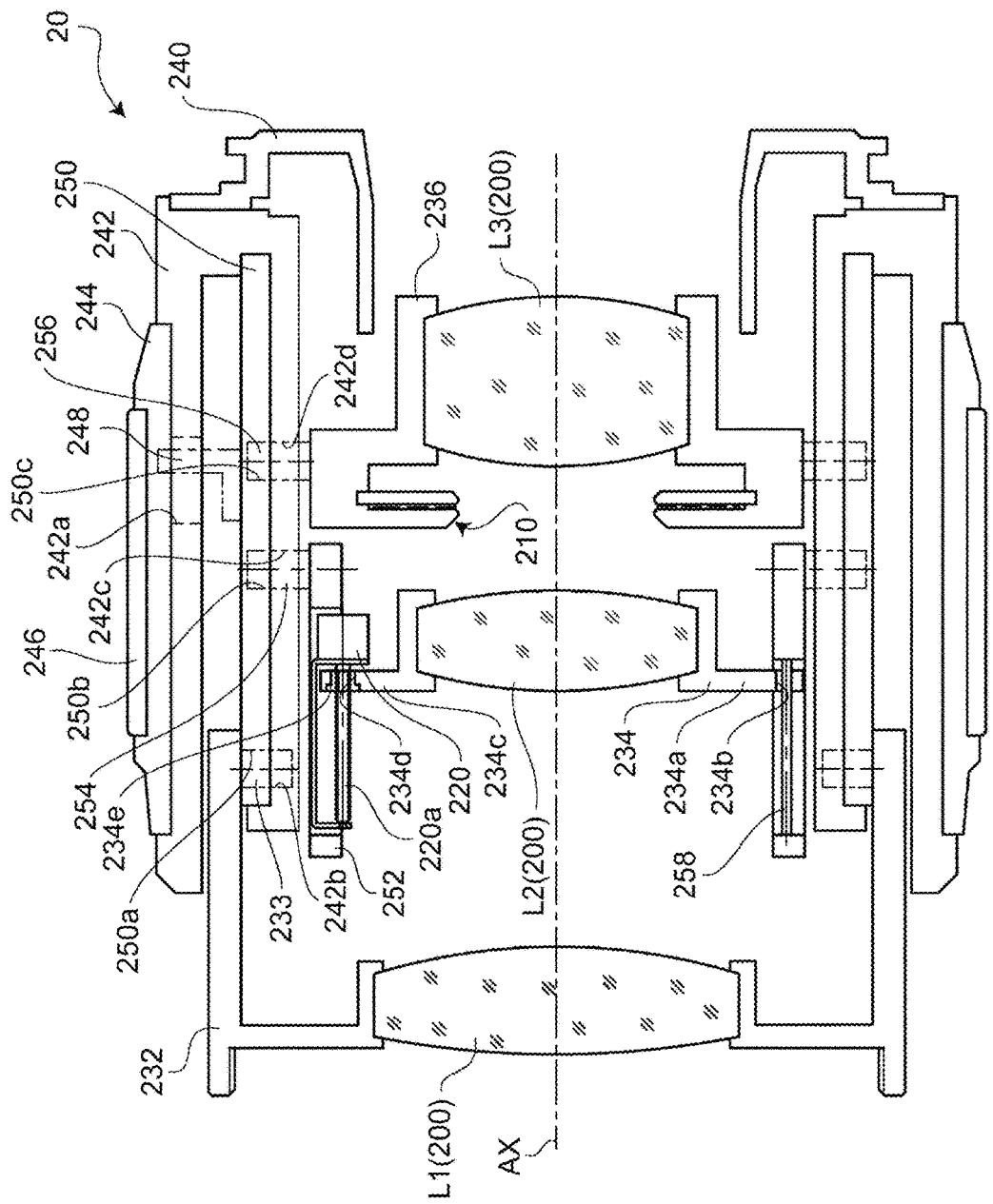

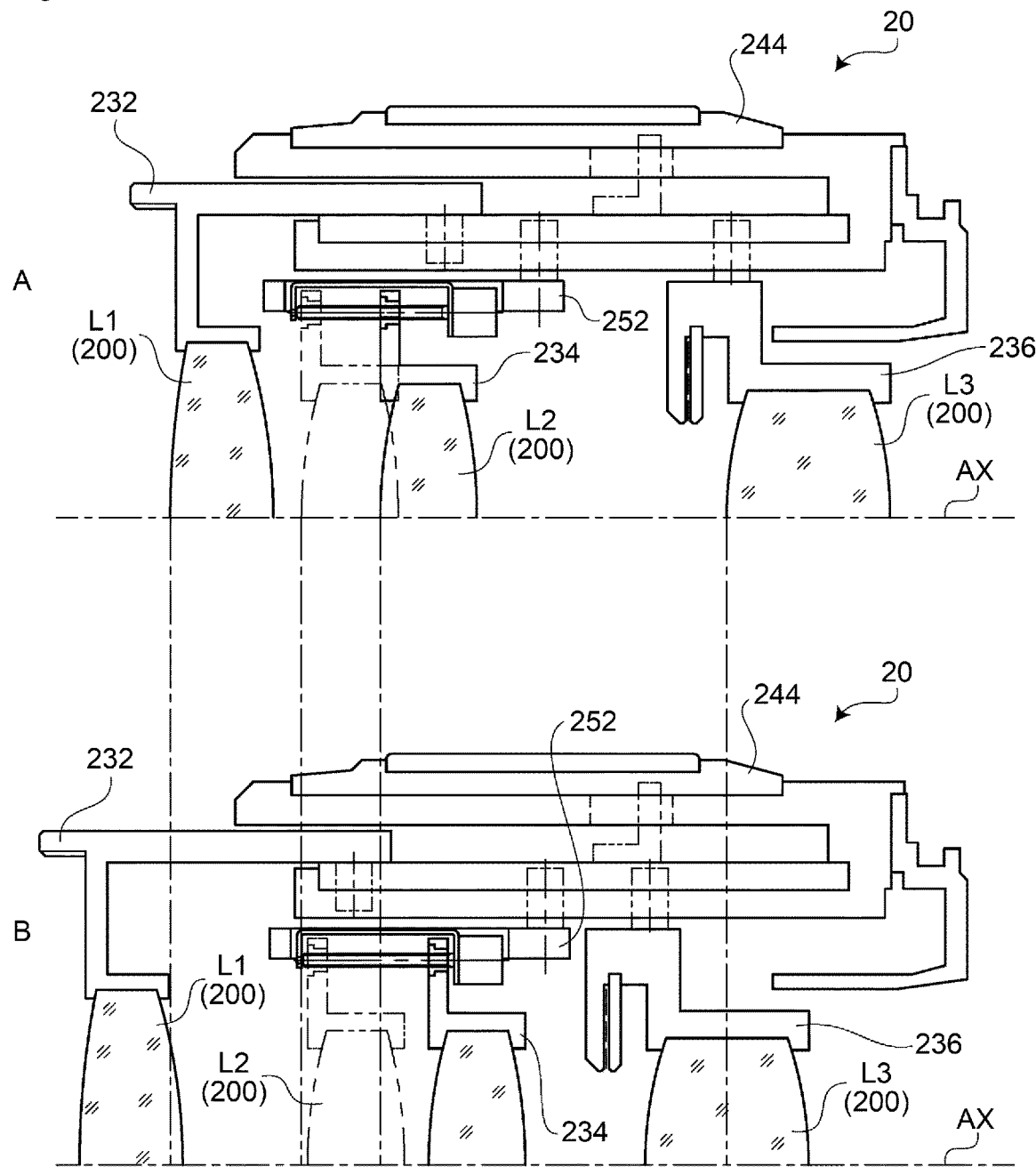
[Fig. 3]

[Fig. 4]
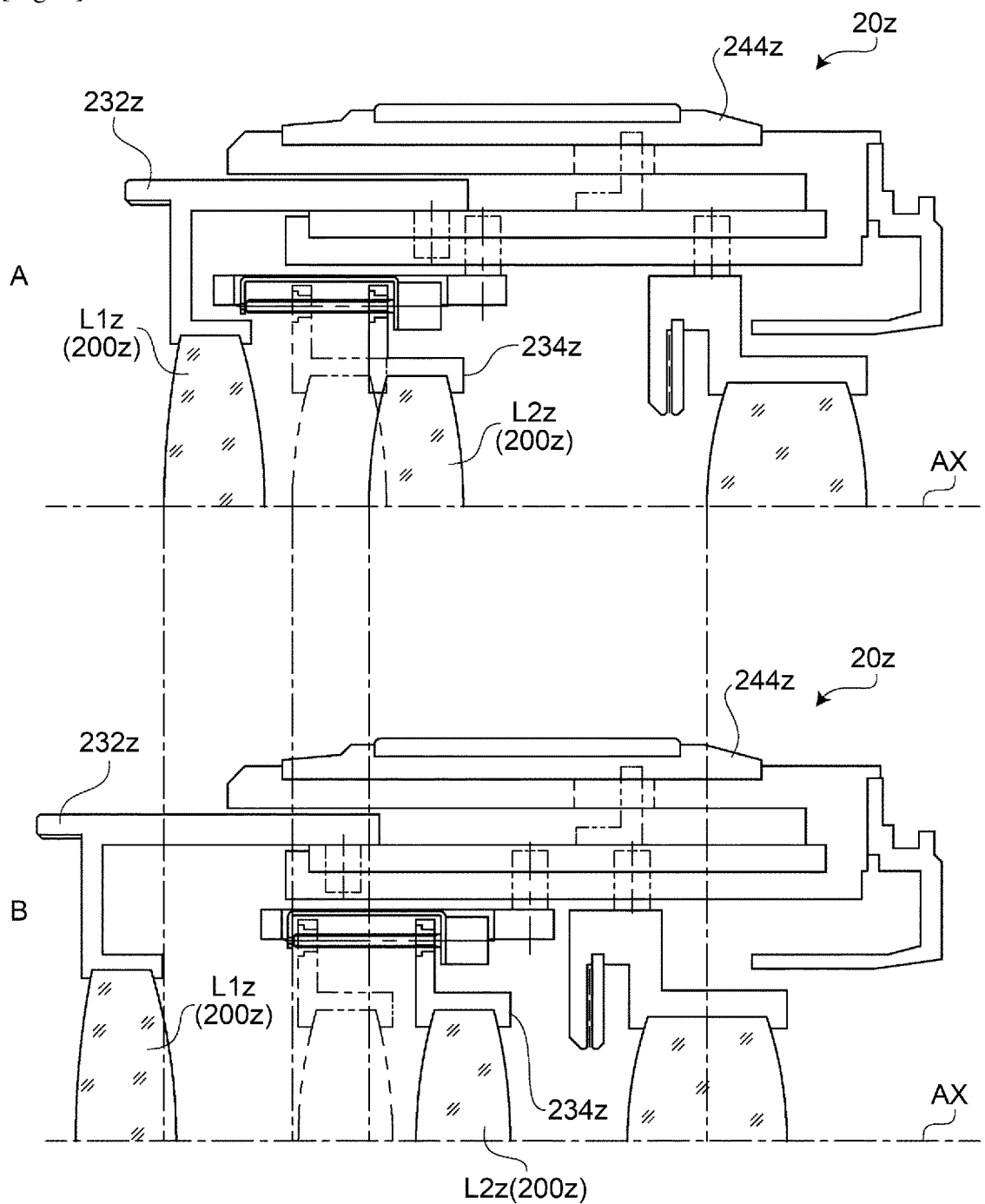

[Fig. 5A]
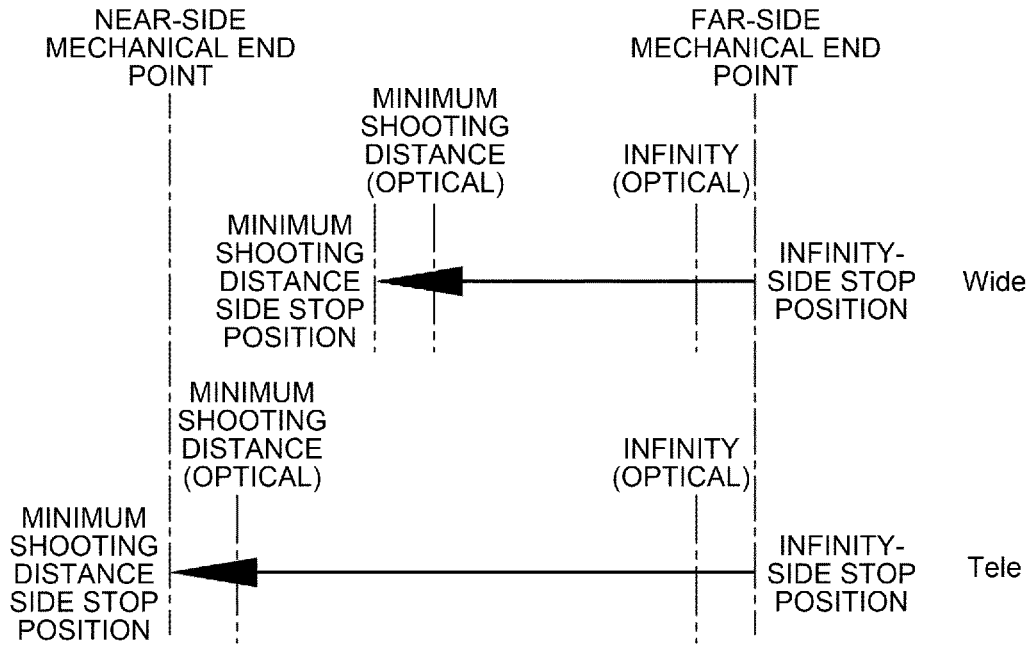
[Fig. 5B]
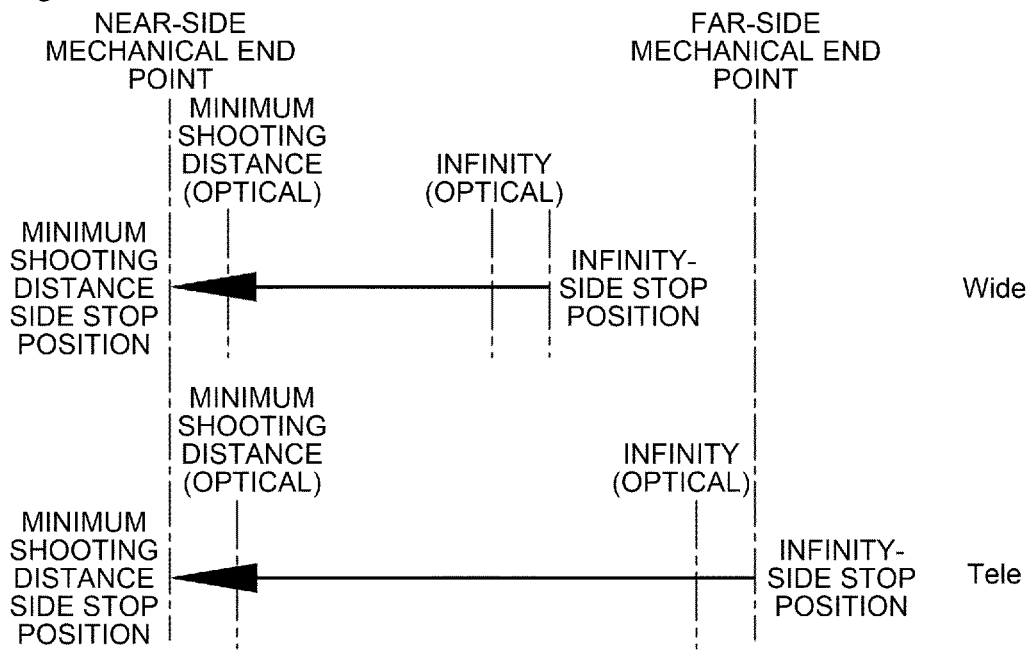

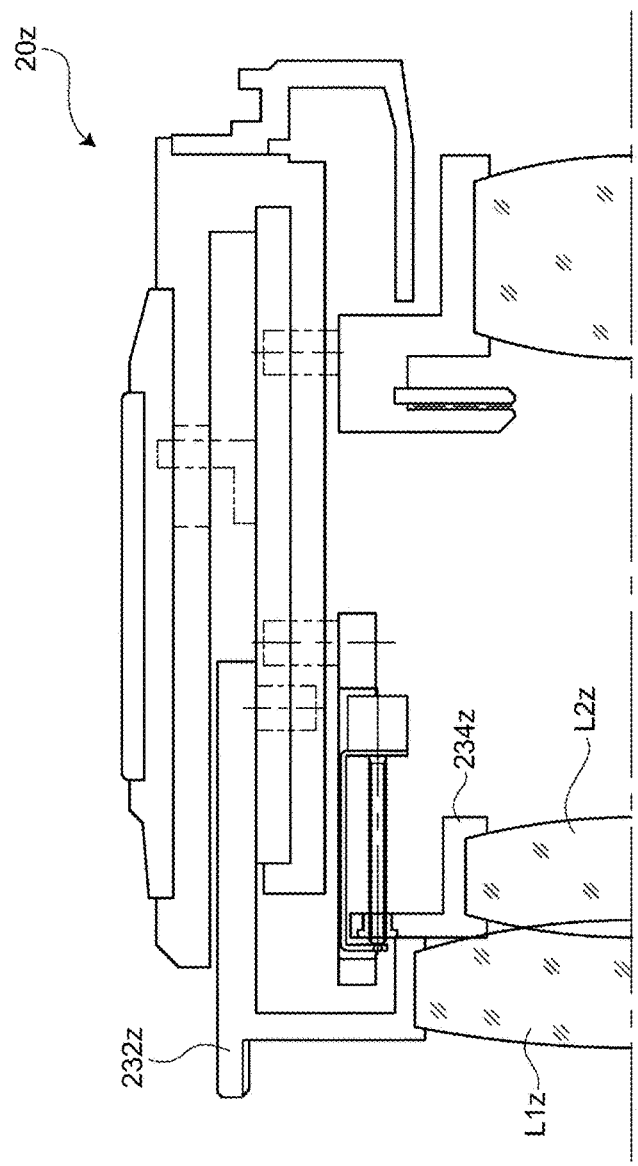
[Fig. 6]
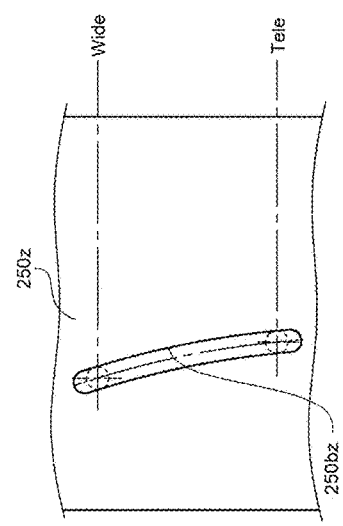
[Fig. 7A]

[Fig. 7B]
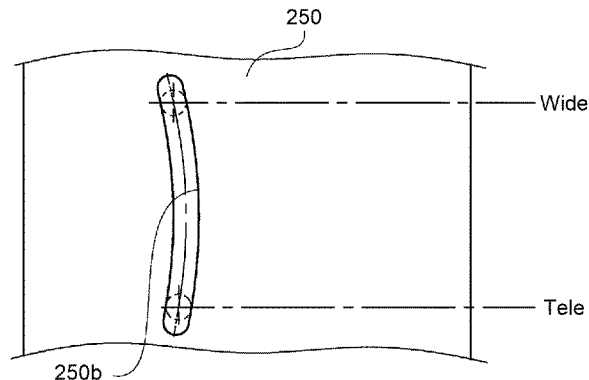
[Fig. 7C]
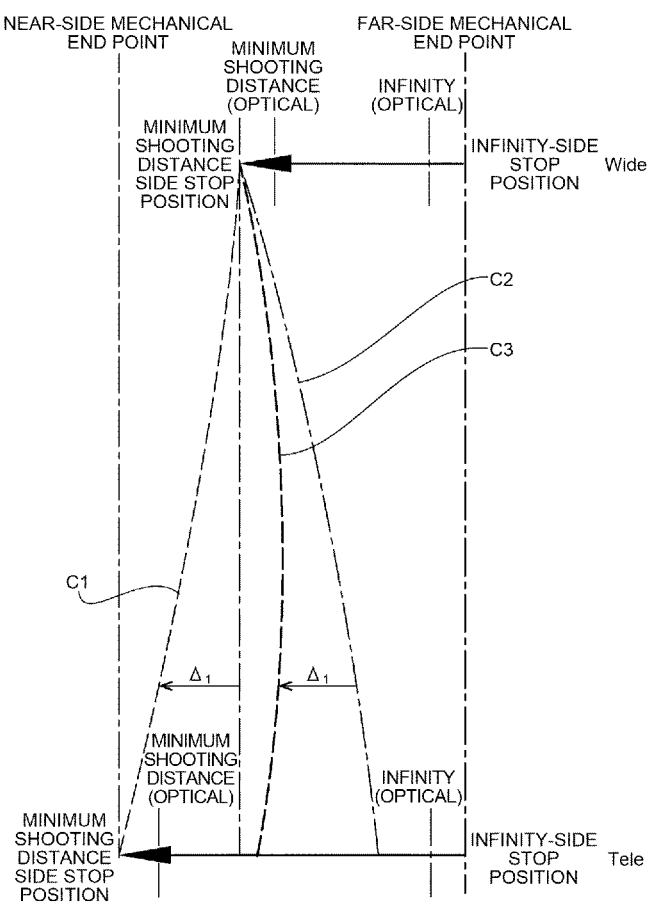

LENS BARREL AND IMAGING DEVICE

CROSS-REFERENCE TO RELATED APPLICATIONS

The present application is based on PCT filing PCT/JP2020/010959, filed Mar. 12, 2020, which claims priority to JP 2019-048910, filed Mar. 15, 2019, the entire contents of each are incorporated herein by reference.

TECHNICAL FIELD

The present invention relates to a lens barrel and an imaging device.

BACKGROUND ART

Lens barrels including variable-power optical systems are known. In such lens barrels, as the zoom magnification changes, the shooting distance changes (the focal plane is moved), and thus the lens barrels fail to maintain focus on an object.

A lens barrel that can prevent defocusing caused by a change in shooting distance during a change in zoom magnification is disclosed in, for example, PLT 1.

The lens barrel disclosed in PTL 1 is configured to, upon operation on a zoom operation ring, move a focus lens group and other lens groups that are elements of a variable-power optical system along different trajectories such that the lens barrel is able to be change zoom magnification while preventing defocusing caused by a change in shooting distance during the change in the zoom magnification.

CITATION LIST

Patent Literature

PTL 1: WO 2018/221723

SUMMARY OF INVENTION

Technical Problem

The conventional lens barrel disclosed in PTL 1 needs to have a sufficient clearance between the focus lens group and the other lens groups so as to prevent interference between the focus lens group and the other lens groups when the focus lens group at a predetermined position moves in accordance with a change in zoom magnification. In other words, at every zoom position, the clearance between the focus lens group and the other lens groups has to be set in consideration of all situations where the focus lens group are moved to become closest to the other lens groups. Thus, it is difficult to design a smaller lens barrel.

The present invention has been made in view of the foregoing, and it is an object of the present invention to provide a lens barrel preferably designed to have a reduced size while preventing interference between a focus lens group and other lens groups, and an imaging device including the lens barrel.

Solution to Problem

A lens barrel according to an aspect of the present invention is configured to be able to change zoom magnification. The lens barrel includes a variable-power optical system, a support, a focus actuator, and a moving unit. The variable-power optical system includes a focus lens group. The support is configured to movably support the focus lens group forward and backward in a direction of an optical axis of the lens barrel. The focus actuator is configured to move the focus lens group supported by the support forward or backward in the direction of the optical axis to change a shooting distance between a minimum shooting distance and infinity. The moving unit is configured to, in response to receiving a driving force for changing the zoom magnification, move a position of the focus lens group and the support in the direction of the optical axis to a position corresponding to the changed zoom magnification. The moving unit being configured to move the focus lens group and the support in the direction of the optical axis by the driving force such that a change in a shooting distance due to a change in the zoom magnification is within a predetermined tolerance when the focus lens group is at a position corresponding to the minimum shooting distance, at every zoom magnification.

An imaging device according to an aspect of the present invention includes the above lens barrel.

Advantageous Effects of Invention

According to an embodiment of the present invention, a lens barrel and an imaging device preferably designed to have a reduced size while preventing interference between a focus lens group and other lens groups are provided.

BRIEF DESCRIPTION OF DRAWINGS

FIG. 1 is a block diagram illustrating a configuration of an imaging device according to an embodiment of the present invention.

FIG. 2 is a longitudinal sectional view of a lens barrel included in the imaging device according to the embodiment of the present invention.

FIG. 3 is a diagram illustrating an upper longitudinal sectional view (A) of the lens barrel according to the embodiment of the present invention with imaging lenses included in the lens barrel being at a wide-angle end, and an upper longitudinal sectional view (B) of the lens barrel with the imaging lenses being at a telephoto end.

FIG. 4 is a diagram illustrating an upper longitudinal sectional view (A) of a lens barrel according to a comparative example with imaging lenses included in the lens barrel being at a wide-angle end, and an upper longitudinal sectional view (B) of the lens barrel with the imaging lenses being at a telephoto end.

FIG. 5A is a diagram schematically illustrating positions of a focus lens according to the comparative example.

FIG. 5B is a diagram schematically illustrating positions of a focus lens according to the embodiment of the present invention.

FIG. 6 is a diagram of the lens barrel according to the comparative example with adjacent lens holders and lenses interfering with each other.

FIG. 7A is a diagram illustrating a cam groove formed on a zoom cam ring of the lens barrel according to the comparative example.

FIG. 7B is a diagram illustrating a cam groove formed on a zoom cam ring of the lens barrel according to the embodiment of the present invention.

FIG. 7C is a diagram illustrating how the cam groove formed on the zoom cam ring according to the embodiment of the present invention is designed.

DESCRIPTION OF EMBODIMENTS

The following describes a lens barrel and an imaging device including the lens barrel according to an embodiment of the present invention with reference to the accompanying drawings.

FIG. 1 is a block diagram illustrating a configuration of an imaging device 1 according to the embodiment of the present invention.

As illustrated in FIG. 1, the imaging device 1 is a single-lens reflex camera and includes a camera body 10 and a lens barrel 20 attachable to and detachable from the camera body 10. The imaging device 1 is not limited to a single-lens reflex camera and may be other types of imaging devices such as a compact digital camera, a mirrorless single-lens reflex camera, a video camera, and a camcorder.

The camera body 10 includes a system controller 100, an operating unit 102, a drive circuit 104, a solid-state image sensor 106, a signal processing circuit 108, an image processing engine 110, a buffer memory 112, a liquid crystal display (LCD) 114, a read only memory (ROM) 116, a flash memory 118, a card interface 120, and a zoom motor 122.

The lens barrel 20 includes imaging lenses 200, a shutter unit 210, and a focus motor 220. The imaging lenses 200 configure a variable-power optical system.

The operating unit 102 includes various types of buttons and dials necessary for a user to operate the imaging device 1, such as a power button, a release button, an imaging mode button, and a zoom switch. When the user operates the power button, a battery (not illustrated) supplies power to the circuits of the imaging device 1 via power lines.

The system controller 100 includes a central processing unit (CPU) and a digital signal processor (DSP). Upon power supply, the system controller 100 accesses the ROM 116 to read a control program, loads the control program on a work area (not illustrated), and executes the loaded control program to control the imaging device 1 collectively.

When, for example, the user operates the release button, the system controller 100 controls the operation of the shutter unit 210 via the drive circuit 104 to provide an appropriate exposure based on a luminance value calculated from an image captured by the solid-state image sensor 106 or a luminance value measured by a light meter (not illustrated) included in the imaging device 1.

More specifically, the operation of the shutter unit 210 is controlled based on an automatic exposure (AE) function selected by the imaging mode button. The AE function includes, for example, a program AE, a shutter priority AE, and an aperture priority AE.

The system controller 100 performs AE control and also autofocus (AF) control. The AF control is implemented by, for example, an active method, a phase detection method, and a contrast detection method. Examples of AF modes include a single center focus point mode using a single center focus area and a multiple focus points mode using a plurality of focus areas. The system controller 100 controls the operation of the focus motor 220 via the drive circuit 104 based on an AF result to adjust the focus of the imaging lenses 200.

When shutter blades of the shutter unit 210 are open, light rays from an object pass through the imaging lenses 200 and an aperture defined by the shutter blades, and are received by a light-receiving surface of the solid-state image sensor 106. When the shutter blades are fully closed, the light rays from the object are blocked by the shutter blades, and thus are not received by the light-receiving surface of the solid-state image sensor 106.

The solid-state image sensor 106 is a complementary metal oxide semiconductor (CMOS) image sensor including a Bayer filter array. The light rays passing through the imaging lenses 106 form an optical image on the pixels of the light-receiving surface, and the solid-state image sensor 106 accumulates electrical charge corresponding to the amount of light of the optical image. The solid-state image sensor 106 converts the accumulated electric charge into a voltage (hereinafter referred to as an "image signal") by using a floating diffusion amplifier. The image signal output from the solid-state image sensor 106 is input to the signal processing circuit 108. The solid-state image sensor 106 may be a charge coupled device (CCD) image sensor or may be an image sensor including a secondary color filter.

The signal processing circuit 108 performs predetermined signal processing such as clamping or demosaicing on the image signal received from the solid-state image sensor 106 and outputs the processed signal to the image processing engine 110.

The image processing engine 110 performs predetermined signal processing, such as matrix calculation, YC separation, and white balancing, on the image signal received from the signal processing circuit 108 and generates a luminance signal Y and color difference signals Cb and Cr. The image processing engine 110 then compresses the signals in a predetermined format such as a joint photographic experts group (JPEG) format. The storage format of the captured image data is not limited to the JPEG format and may be a RAW file format with minimum image processing (e.g., black level corrections). The buffer memory 112 is used as a transitory memory that temporarily stores therein processed data during processing of the image processing engine 110.

The image processing engine 110 converts the luminance signal Y and the color difference signals Cb and Cr into predetermined video signals and outputs the converted signals to the LCD 114. The LCD 114 modulates and controls the liquid crystals based on the video signals received from the image processing engine 110. The LCD 114 then displays the captured image of the object on a display screen. The user can view a real-time through-the-lens image (live-view image) captured with an appropriate exposure and focus provided by the AE control and the AF control through the display screen of the LCD 114.

A memory card (not illustrated) is detachably inserted in a card slot of the card interface 120. The image processing engine 110 can communicate with the memory card via the card interface 120. The image processing engine 110 stores the generated captured image data in the memory card or in the flash memory 118.

FIG. 2 is a longitudinal sectional view of the lens barrel 20. Views A and B in FIG. 3 are upper longitudinal sectional views of the lens barrel 20. View A of FIG. 3 illustrates a state in which the imaging lenses 200 are at a wide-angle end. View B of FIG. 3 illustrates a state in which the imaging lenses 200 are at a telephoto end.

The imaging lenses 200 include lenses L1, L2, and L3. To more clearly indicate the differences between the positions of the lenses L1 to L3 in the respective states, dash-dot lines indicating the positions of the lenses L1 to L3 at the wide-angle end are drawn from view A of FIG. 3 to view B illustrating the state of the lenses L1 to L3 at the telephoto end.

As illustrated in FIGS. 2 and 3, the lenses L1, L2, and L3 are held by a first lens holder 232, a second lens holder 234, and a third lens holder 236, respectively. In views A and B in FIG. 3, the second lens holder 234 and the lens L2 in a state in which the shooting distance is at infinity are illustrated in solid line, and the second lens holder 234 and the lens L2 in a state in which the shooting distance is at the minimum shooting distance are illustrated in dash-two-dotted line.

The lens barrel 20 includes a mount 240. The lens barrel 20 is detachably mounted to the camera body via the mount 240. The mount 240 holds a base end of a fixed barrel 242.

The fixed barrel 242 is a barrel member having a center axis aligned with an optical axis AX of the imaging lenses 200. A zoom operation ring 244 is slidably mounted to the outer circumference of the fixed barrel 242 to slide in a circumferential direction of the fixed barrel 242. A zoom rubber 246 surrounds an outer circumference of the zoom operation ring 244. A zoom lever 248 protruding inward in a radial direction of the zoom operation ring 244 is mounted to an inner wall of the zoom operation ring 244. The zoom lever 248 is inserted in a through-hole 242a formed on the fixed barrel 242 and a leading end of the zoom lever 248 is engaged with a zoom cam ring 250.

A plurality of rollers 233 are mounted at regular intervals to an inner circumferential surface of a rear end of the first lens holder 232.

The zoom cam ring 250 has a cam groove 250a that passes through the zoom cam ring 250 in the radial direction. The fixed barrel 242 has a groove 242b. The rollers 233 are cam followers and are slidably fitted with the groove 242b through the cam groove 250a. In the present embodiment, one member being "slidably fitted" with another member means that the one member has a clearance fit with the other member, and indicates a state in which the one member fitted with the other member can slide relative to the other member. In the example above, the rollers 233 are fitted with the cam groove 250a and the groove 242b such that the rollers 233 can slide relative to the cam groove 250a and the groove 242b.

The lens barrel 20 includes a moving frame 252 that holds the second lens holder 234. A plurality of rollers 254 are mounted at regular intervals to an outer circumferential surface of a rear end of the moving frame 252.

The zoom cam ring 250 has a cam groove 250b. The fixed barrel 242 has a hole 242c that passes through the fixed barrel 242 in the radial direction. The rollers 254 are cam followers and are slidably fitted with the cam groove 250b through the hole 242c.

A plurality of rollers 256 are mounted at regular intervals to an outer circumferential surface of the third lens holder 236. The third lens holder 236 holds the shutter unit 210.

The zoom cam ring 250 has a cam groove 250c. The fixed barrel 242 has a hole 242d that passes through the fixed barrel 242 in the radial direction. The rollers 256 are cam followers and are slidably fitted with the cam groove 250c through the hole 242d.

When the user operates and rotates the zoom operation ring 244 in the circumferential direction of the fixed barrel 242, the rotation of the zoom operation ring 244 is transmitted to the zoom cam ring 250 via the zoom lever 248. The zoom cam ring 250 is then rotated by the transmitted rotational force, and the rollers 233 slide along the cam groove 250a and the groove 242b, the rollers 254 slide along the hole 242c and the cam groove 250b, and the rollers 256 slide along the hole 242d and the cam groove 250c. This structure converts the rotation of the zoom cam ring 250 into a linear motion, and in the lens barrel 20, the linear motion moves the first lens holder 232 and the lens L1 held thereby forward or backward in the direction of the optical axis AX, moves the moving frame 252 and the second lens holder 234 and the lens L2 held thereby forward or backward in the direction of the optical axis AX, and moves the third lens holder 236 and the lens L3 held thereby forward or backward in the direction of the optical axis AX. As a result, the lens barrel 20 changes the zoom magnification while preventing defocusing that may be caused by a change in shooting distance during a change in zoom magnification.

The lens barrel 20 is able to change the zoom magnification by using the driving force supplied via the zoom operation ring 244 as described above, and also by using the driving force supplied from the zoom motor 122. In other words, the lens barrel 20 is able to change zoom magnification manually and electrically.

Members (e.g., the zoom operation ring 244, the zoom cam ring 250, and the rollers) that move together with the zoom operation ring 244 are configured as a magnification changer that changes the zoom magnification of the imaging lenses 200 in accordance with the operation on the zoom operation ring 244.

The second lens holder 234 has a plurality of protruding portions 234a protruding outward in the radial direction at regular intervals. The protruding portions 234a have straight holes 234b. A plurality of guide shafts 258 mounted to the moving frame 252 and extending in the direction of the optical axis AX are slidably inserted in the straight holes 234b. In other words, the second lens holder 234 is held by the guide shafts 258 such that it can move forward and backward in the direction of the optical axis AX relative to the moving frame 252.

The second lens holder 234 has a single protruding portion 234c protruding outward in the radial direction. The protruding portion 234c has a straight hole 234d. A nut 234e is fitted in the straight hole 234d. The nut 234e is engaged with a feed screw 220a (feed member) of the focus motor 220 (e.g., a stepping motor or a DC motor).

When the feed screw 220a of the focus motor 220 rotates, the rotational force (driving force) is transmitted to the second lens holder 234 via the nut 234e. The rotational force transmitted to the second lens holder 234 is restricted by the straight holes 234b and the guide shafts 258 and is converted into a linear motion. Accordingly, the second lens holder 234 moves forward or backward in the lens barrel 20 in the direction of the optical axis AX in accordance with the amount and direction of the rotation of the feed screw 234g. The forward or backward movement of the lens L2, which is an example of a focus lens group, in the direction of the optical axis AX changes the shooting distance of the lens barrel 20 (in other words, changes focus of the lens barrel 20).

The second lens holder 234 is configured as a support that movably supports the lens L2 forward and backward in the direction of the optical axis AX. The focus motor 220 operates as a focus actuator that can change the shooting distance between the minimum shooting distance and infinity by moving the lens L2 supported by the second lens holder 234 forward or backward in the direction of the optical axis AX.

As described above, upon receiving a driving force via the zoom operation ring 244 or from the zoom motor 122, the moving frame 252 moves the second lens holder 234 and the lens L2 forward or backward in the direction of the optical axis AX in the lens barrel 20. In other words, the moving frame 252 operates as a moving unit that moves, upon receiving a driving force for changing zoom magnification, the second lens holder 234 and the lens L2 in the direction of the optical axis AX to a position corresponding to the changed zoom magnification.

Views A and B in FIG. 4 are upper longitudinal sectional views of a lens barrel 20z according to a comparative example. View A of FIG. 4 illustrates a state in which imaging lenses 200z of the lens barrel 20z are at the wide-angle end. View B of FIG. 4 illustrates a state in which the imaging lenses 200z are at the telephoto end. In views A and B in FIG. 4, a second lens holder 234z and a lens L2z in a state in which the shooting distance is at infinity are illustrated in solid line, and the second lens holder 234z and the lens L2z in a state in which the shooting distance is at the minimum shooting distance are illustrated in dash-two-dotted line.

FIG. 5A schematically illustrates positions of the lens L2z according to the comparative example. The upper diagram of FIG. 5A illustrates positions of the lens L2z when the imaging lenses 200z are at the wide-angle end. The lower diagram of FIG. 5A illustrates positions of the lens L2z when the imaging lenses 200z are at the telephoto end.

FIG. 5B schematically illustrates positions of the lens L2 according to the present embodiment. The upper diagram of FIG. 5B illustrates positions of the lens L2 when the imaging lenses 200 are at the wide-angle end. The lower diagram of FIG. 5B illustrates positions of the lens L2 when the imaging lenses 200 are at the telephoto end.

In FIG. 5A (and in FIG. 5B), "far-side mechanical end point" indicates a rear end of the feed screw 220a in the direction of the optical axis AX (in other words, a rear mechanical end point to which the focus motor 220 can move the lens L2z (and the lens L2) in the direction of the optical axis AX). In FIG. 5A (and in FIG. 5B), "near-side mechanical end point" indicates a front end of the feed screw 220a in the direction of the optical axis AX (in other words, a front mechanical end point to which the focus motor 220 can move the lens L2z (and the lens L2) in the direction of the optical axis AX).

In FIG. 5A (and in FIG. 5B), "infinity (optical)" indicates a position of the lens L2z (and of the lens L2) when the imaging lenses 200z (and the imaging lenses 200) focus at infinity. In FIG. 5A (and in FIG. 5B), "minimum shooting distance (optical)" indicates a position of the lens L2z (and of the lens L2) when the imaging lenses 200z (and the imaging lenses 200) focus at the minimum shooting distance.

In FIG. 5A (and in FIG. 5B), "infinity-side stop position" indicates a position obtained by adjusting, in consideration of an amount of optical correction, the position of the lens L2z (and of the lens L2) when the imaging lenses 200z (and the imaging lenses 200) focus at infinity. In FIG. 5A (and in FIG. 5B), "minimum shooting distance side stop position" indicates a position obtained by adjusting, in consideration of an amount of optical correction, the position of the lens L2z (and of the lens L2) when the imaging lenses 200z (and the imaging lenses 200) focus at the minimum shooting distance.

The amount of optical correction indicates, for example, an amount of change in the focus position with temperature fluctuations or an amount of adjustment such as zooming adjustment for satisfying the optical performance (for example, an amount of adjustment on the focus positions at the wide-angle end and at the telephoto end set at the factory or an amount that is adjusted in consideration of an amount of movement required for contrast AF). In other words, the "infinity-side stop position" is the most deviated position of "infinity (optical)" due to, for example, temperature fluctuations, and the "minimum shooting distance side stop position" is the most deviated position of the "minimum shooting distance (optical)" due to, for example, temperature fluctuations.

The lens barrel 20z according to the comparative example is designed based on the infinity-side stop position. A structure designed based on the infinity-side stop position allows the lens barrel to change the zoom magnification with a minimum change in shooting distance when the imaging lenses 200z focus at infinity. More specifically, a structure designed based on the infinity-side stop position allows the lens barrel to have substantially zero deviation in focus at every zoom magnification when the imaging lenses 200z focus at infinity. The substantially zero deviation in focus includes not only zero focus deviation but also a focus deviation within a predetermined tolerance range centered about zero.

At the wide-angle end, the lens barrel 20z according to the comparative example designed based on the infinity-side stop position changes the focus of the imaging lenses 200z between infinity and the minimum shooting distance by moving the lens L2z forward or backward in the direction of the optical axis AX in a range between the far-side mechanical end point and a midpoint between the far-side mechanical end point and the near-side mechanical end point (in a range closer to the far-side mechanical end point between the far-side mechanical end point and the near-side mechanical end point) (see view A of FIG. 4 and the upper diagram of FIG. 5A).

At the telephoto end, the lens barrel 20z according to the comparative example designed based on the infinity-side stop position changes the focus of the imaging lenses 200z between infinity and the minimum shooting distance by moving the lens L2z forward or backward in the direction of the optical axis AX in a range between the far-side mechanical end point and the near-side mechanical end point (see view B of FIG. 4 and the lower diagram of FIG. 5A).

Since the lens barrel 20z according to the comparative example is designed based on the infinity-side stop position, the moving range of the lens L2z is the range in consideration of the amount of optical correction.

Suppose that the lens barrel 20z according to the comparative example has an entire length equal to the entire length of the lens barrel 20 according to the present embodiment. In this case, for example, when the imaging lenses 200z are at the telephoto end and focus at the minimum shooting distance (see dash-two-dotted line in view B of FIG. 4), a user's operation on the zoom operation ring 244z to the wide-angle end moves the first lens holder 232z and the lens L1z backward in the direction of the optical axis AX and moves the second lens holder 234z and the lens L2z forward in the direction of the optical axis AX in the lens barrel 20z. In this case, as illustrated in FIG. 6, the first lens holder 232z and the lens L1z interfere with the second lens holder 234z and the lens L2z.

To prevent such interference, for example, the lens barrel 20z according to the comparative example has to have a longer entire length and have a larger clearance between the first lens holder 232z and the second lens holder 234z.

Contrary to the comparative example, the lens barrel 20 according to the present embodiment is designed based on the minimum shooting distance side stop position. A structure designed based on the minimum shooting distance side stop position allows the lens barrel to change the zoom magnification with a minimum change in shooting distance when the imaging lenses 200 focus at the minimum shooting distance. More specifically, a structure designed based on the minimum shooting distance side stop position allows the lens barrel to have substantially zero deviation in focus at every zoom magnification when the imaging lenses 200 focus at the minimum shooting distance.

At the telephoto end, the lens barrel 20 according to the present embodiment designed based on the minimum shooting distance side stop position changes the focus of the imaging lenses 200 between infinity and the minimum shooting distance by moving the lens L2 forward or backward in the direction of the optical axis AX in a range between the far-side mechanical end point and the near-side mechanical end point (see view B of FIG. 3 and the lower diagram of FIG. 5B).

Since the lens barrel 20 according to the present embodiment is designed based on the minimum shooting distance side stop position, the moving range of the lens L2 at the telephoto end is the rage in consideration of the amount of optical correction and has the same range as that of the comparative example.

At the wide-angle end, the lens barrel 20 according to the present embodiment designed based on the minimum shooting distance side stop position changes the focus of the imaging lenses 200 between infinity and the minimum shooting distance by moving the lens L2 forward or backward in the direction of the optical axis AX in a range between the near-side mechanical end point and a midpoint between the near-side mechanical end point and the far-side mechanical end point (in a range closer to the near-side mechanical end point between the near-side mechanical end point and the far-side mechanical end point) (see view A of FIG. 3 and the upper diagram of FIG. 5B).

Since the lens barrel 20 according to the present embodiment is designed based on the minimum shooting distance side stop position, the moving range of the lens L2 at the wide-angle end is the range in consideration of the amount of optical correction and is generally shifted toward the near-side mechanical end point relative to the moving range according to the comparative example.

In the present embodiment, when the imaging lenses 200 are at the telephoto end and focus at the minimum shooting distance (see dash-two-dotted line in view B of FIG. 3), a user's operation on the zoom operation ring 244 to the wide-angle end moves the first lens holder 232 and the lens L1 backward in the direction of the optical axis AX and moves the second lens holder 234 and the lens L2 forward in the direction of the optical axis AX.

In the present embodiment, the moving range of the lens L2 at the wide-angle end is generally shifted toward the near-side mechanical end point relative to the moving range of the comparative example, and accordingly, the position of the moving frame 252 and the second lens holder 234 and the L2 held thereby is shifted toward the image plane compared to the comparative example. In this case, (that is, when the first lens holder 232 and the lens L1 are positioned at the rear-most position and the second lens holder 234 and the lens L2 are positioned at the front-most position), the first lens holder 232 and the lens L1 will not interfere with the second lens holder 234 or the lens L2 (see dash-two-dotted line in view A of FIG. 3).

In other words, the moving frame 252 moves the second lens holder 234 and the lens L2 held thereby in the direction of the optical axis AX by the driving force for changing the zoom magnification, such that a change in the shooting distance due to the change in zoom magnification is within a predetermined tolerance (e.g., substantially zero as described above) when the lens L2 is at a position corresponding to the minimum shooting distance, at every zoom magnification from the wide-angle end to the telephoto end.

The position corresponding to the minimum shooting distance is, for example, the minimum shooting distance side stop position. The minimum shooting distance side stop position is a position obtained by adjusting the position indicated by the "minimum shooting distance (optical)" in consideration of the amount of optical correction. More specifically, the minimum shooting distance side stop position is forward from the position indicated by the "minimum shooting distance (optical)" in the direction of the optical axis AX by an amount corresponding to the amount of optical correction.

The lens barrel 20 according to the present embodiment is designed based on the minimum shooting distance side stop position, and this structure is more likely to prevent interference between the lens L2 and other lens groups, thereby increasing the design flexibility and enabling, for example, a smaller configuration of the lens barrel 20.

FIG. 7A illustrates a cam groove 250*bz* formed on the zoom cam ring 250*z* according to the comparative example. FIG. 7B illustrates a cam groove 250*b* formed on the zoom cam ring 250 according to the present embodiment. FIG. 7C is a diagram illustrating how the cam groove 250*b* according to the present embodiment is designed.

In the present embodiment, as zoom magnification becomes higher, the amount of movement of the lens L2 required for changing from infinity to the minimum shooting distance increases. Consider a configuration in which the imaging lenses 200 focus at infinity at every zoom magnification from the wide-angle end to the telephoto end with the lens L2 being at the infinity-side stop position. In this configuration, a trajectory of the position of the lens L2 between the far-side mechanical end point and the near-side mechanical end point when the imaging lenses 200 focus at the minimum shooting distance at every zoom magnification is illustrated in thin dashed curve (indicated by reference sign C1 in FIG. 7C). As indicated by the thin dashed curve, when the imaging lenses 200 are at a predetermined zoom magnification, an amount of movement required for the lens L2 to change focus from infinity to the minimum shooting distance is increased by $\Delta_1$ compared to when the imaging lenses 200 are at the wide-angle end.

In FIG. 7C, dash-dot curve (indicated by reference sign C2 in FIG. 7C) represents a trajectory of the position of the moving frame 252*z* according to the comparative example from the wide-angle end to the telephoto end, and corresponds to the center line (dash-dot line) of the cam groove 250*bz* in FIG. 7A. The dash-dot curve is obtained from a structure designed based on the infinity-side stop position.

In FIG. 7C, a bold dashed curve (indicated by reference sign C3 in FIG. 7C) represents a trajectory of the position of the moving frame 252 according to the present embodiment from the wide-angle end to the telephoto end, and corresponds to the center line (dash-dot line) of the cam groove 250*b* in FIG. 7B. The bold dashed curve is obtained from a structure designed based on the minimum shooting distance side stop position. Specifically, the bold dashed curve is obtained by shifting the dash-dot curve by $\Delta_1$.

The exemplary embodiment of the present invention has been described. However, the embodiment of the present invention is not limited to the description above, and various modifications may be made within the technical spirit and scope of the present invention. For example, combinations, as appropriate, of the examples and embodiments described in the present description and other embodiments that may become obvious to those skilled in the art are included in the embodiment of the present invention.

REFERENCE SIGNS LIST

1 Imaging device
10 Camera body
20 Lens barrel
122 Zoom motor
200 Imaging lens
210 Shutter unit
220 Focus motor
220a Feed screw
232 First lens holder
233 Roller
234 Second lens holder
234a Protruding portion
234b Straight hole
234c Protruding portion
234d Straight hole
234e Nut
236 Third lens holder
240 Mount
242 Fixed barrel
242a Through-hole
242b Groove
242c Hole
242d Hole
244 Zoom operation ring
246 Zoom rubber
248 Zoom lever
250 Zoom cam ring
250a Cam groove
250b Cam groove
250c Cam groove
252 Moving frame
254 Roller
256 Roller
258 Guide shaft

The invention claimed is:

1. A lens barrel configured to be able to change zoom magnification, the lens barrel comprising:
a variable-power optical system including a focus lens group;
a support configured to movably support the focus lens group forward and backward in a direction of an optical axis of the lens barrel;
a focus actuator configured to move the focus lens group supported by the support forward or backward in the direction of the optical axis to change a shooting distance between a minimum shooting distance and infinity; and
a moving structure configured to, in response to receiving a driving force for changing the zoom magnification, move a position of the focus lens group and the support in the direction of the optical axis to a position corresponding to the changed zoom magnification,
the moving structure being configured to move the focus lens group and the support in the direction of the optical axis by the driving force such that a change in a shooting distance due to a change in the zoom magnification is within a predetermined tolerance when the focus lens group is at a position corresponding to the minimum shooting distance, at every zoom magnification.

2. The lens barrel according to claim 1, wherein the position corresponding to the minimum shooting distance is a position obtained by adjusting, in consideration of a predetermined amount of correction, a position at which the shooting distance of the variable-power optical system is the minimum shooting distance.

3. The lens barrel according to claim 2, wherein the position corresponding to the minimum shooting distance is a position forward from the position at which the shooting distance of the variable-power optical system is the minimum shooting distance by an amount corresponding to the amount of correction.

4. The lens barrel according to claim 1, wherein
the focus actuator includes a feed member configured to move the focus lens group forward and backward in the direction of the optical axis, and
the position corresponding to the minimum shooting distance is a position when the focus lens group is moved by the feed member most forward in the direction of the optical axis.

5. The lens barrel according to claim 4, wherein the position corresponding to the minimum shooting distance is a position corresponding to a front end of the feed member in the direction of the optical axis.

6. The lens barrel according to claim 1, further comprising:
an operation ring; and
a magnification changer configured to change zoom magnification of the variable-power optical system in accordance with an operation on the operation ring.

7. An imaging device comprising the lens barrel according to claim 1.

* * * * *